United States Patent Office 3,573,288
Patented Mar. 30, 1971

3,573,288
PIPERAZINYLIMINOMETHYLPYRIDINIUM
COMPOUNDS
John W. Cusic, Skokie, Ill. 60076, and Peter Yonan,
Morton Grove, Ill. 60053
No Drawing. Filed Apr. 1, 1968, Ser. No. 717,955
Int. Cl. C07d 31/42
U.S. Cl. 260—240  5 Claims

ABSTRACT OF THE DISCLOSURE

Pyridinium compounds of the formula

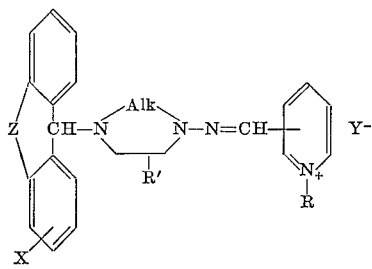

wherein Alk is ethylene, propylene, or trimethylene; R is lower alkyl; R' is hydrogen or methyl; X is hydrogen, methyl, or halogen; Y is halogen; and Z is ethylene, vinylene, or trimethylene are described herein. The compounds involved possess anti-arrhythmic activity. They are also anti-bacterial, anti-protozoal, and anti-algal agents. The compounds are prepared by the quaternization of the appropriate pyridyl compound or by the reaction of the appropriate N-aminopiperazine with a formyl-1-alkylpyridinium salt.

SUMMARY OF THE INVENTION

The present invention relates to a group of pyridinium compounds which are based on pyridinecarboxaldehyde derivatives of 1-amino-4-dibenzocycloheptenylpiperazines and related compounds. More particularly, the present invention relates to a group of compounds having the following general formula

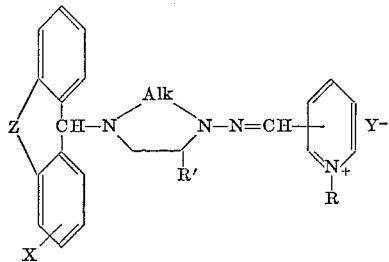

wherein Alk is selected from the group consisting of ethylene, propylene, and trimethylene; R is lower alkyl; R' is selected from the group consisting of hydrogen and methyl; X is selected from the group consisting of hydrogen, methyl, and halogen; Y is halogen; and Z is selected from the group consisting of ethylene, vinylene, and trimethylene.

The lower alkyl radicals referred to above contain up to 6 carbon atoms and can be exemplified by methyl, ethyl, propyl, and butyl. The halogens referred to above include fluorine, chlorine, bromine, and iodine.

The compounds of this invention are useful because of their pharmacological properties. More particularly, the present compounds are similar to quinidine in that they possess anti-arrhythmic activity. Thus, they cause a return to normal rhythm in animals in which artificial arrhythmias has been induced. The present compounds, however, do not possess anti-convulsant activity.

The anti-arrhythmic activity of the present compounds has been demonstrated in the following way. Ventricular arrhythmia is induced by a 2-stage ligation of the anterior descending branch of the left coronary artery in each of two dogs. 5 mg./kg. Quantities of test compound are administered intraveneously at intervals to a possible maximum accumulated dose of 15 mg./kg. A compound is rated active if it produces at least a 25% reduction in ectopic beats for a period of at least 10 minutes in half or more of the dogs tested. 2-[4-(10,11-dihydro-5H-dibenzo[a,d]cyclohepten - 5-yl)-1-piperazinyliminomethyl]-1-methylpyridinium iodide, tested in this way, was found to be active in two out of two dogs at an average dose of 12.5 mpk for a period greater than 15 minutes.

The compounds of the present invention are also antibiotic agents against a variety of organisms. Thus, they inhibit the growth of bacteria such as *Diplococcus pneumoniae*, protozoa such as *Tetrahymena gelleii*, and algae such as *Chlorella vulgaris*. The present compounds can thus be combined with various known excipients and adjuvants in the form of dusts, solutions, suspensions, ointments, and sprays to provide compositions useful for disinfecting purposes.

The compounds of the present invention can be prepared by the reaction of a hydrazone of the formula

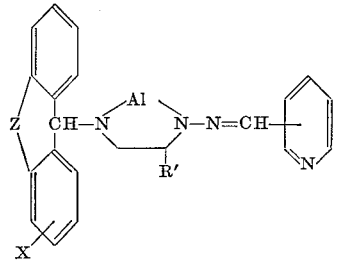

with a compound of the formula R—Y wherein Alk, R, R', X, Y, and Z are defined as above. This reaction can be carried out at room temperature although it is usually desirable to heat the reactants in a pressure bottle.

Alternately, the present compounds can be prepared by the reaction of an aminopiperazine of the formula

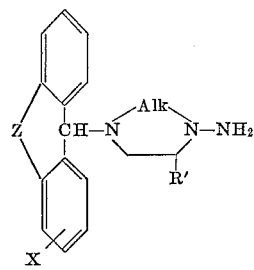

wherein Alk, R', X, and Z are defined as above with a formyl-1-alkylpyridinium halide. This reaction is carried out in an inert solvent in the present of an acid such as acetic acid. A catalytic amount of acid is usually sufficient in the case of the 3-formlypyridinium compound although a larger quantity of acid is desirable in the case of the 2- and 4-formylpyridinium compounds. The preparation of the hydrazones and aminopiperazines used as starting materials in the above reactions is described in detail in application Ser. No. 537,308, filed Mar. 25, 1966 (U.S. Pat. 3,377,344).

The following examples are presented to further illustrate the present invention; they should not be construed as limiting it in spirit or in scope. In these examples, quantities are indicated in parts by weight unless parts by vol-

EXAMPLE 1A

A suspension of 10 parts of 1-(10,11-dihydro-5H-dibenzo[a,d]cyclohepten-5-yl) - 4 - (2 - pyridylmethyleneamino)-piperazine in 228 parts of methyl iodide is stirred at room temperature for 4 hours. The original solid present dissolves and a new solid appears. This solid is separated by filtration and recrystallized from a mixture of ethanol and ether to give 2-[4-(10,11-dihydro-5H dibenzo [a,d]cyclohepten-5-yl) - 1 - piperazinylaminomethyl]-1-methylpyridinium iodide melting at about 196–197° C. with decomposition. This compound has the following formula

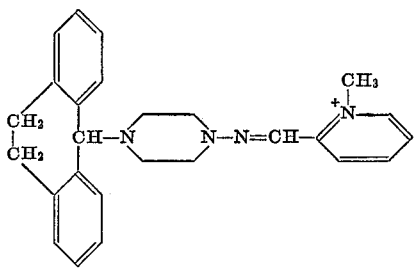

EXAMPLE 1B

A solution of 1 part of 1-amino-4-(10,11-dihydro-5H-dibenzo[a,d]cyclohepten-5-yl)piperazine, 1 part of 2-formyl-1-methlypyridinium iodide, and 1 part of glacial acetic acid in 4 parts of ethanol is heated until solution takes place. The solution is then cooled and the precipitate which forms is separated and recrystallized from a mixture of ethanol and ether to give 2-[4-(10,11-dihydro-5H-dibenzo [a,d]-cyclohepten-5-yl) - 1 - piperazinyliminomethyl]-1-methylpyridinium iodide melting at about 197–198° C. with decomposition.

EXAMPLE 2A

To a solution of 10 parts of 1-(10,11-dihydro-5H-dibenzo[a,d]cyclohepten-5-yl) - 4 - (4-pyridylmethyleneamino)-piperazine in 240 parts of acetone is added 20 parts of methyl iodide. The solution is heated for a few minutes and then cooled. The precipitate which forms is separated by filtration and recrystallized from a mixture of methanol and ether to give 4-[4-(10,11-dihydro-5H-dibenzo[a,d] - cyclohepten-5-yl)-1-piperazinyliminomethyl]-1-methylpyridinium iodide melting at about 250–251° C. with decomposition.

EXAMPLE 2B

A solution of 1 part of 1-amino-4-(10,11-dihydro-5H-dibenzo[a,d]cyclohepten-5-yl)piperazine, 1 part of 4-formyl-1-methlypyridinium iodide and 1 part of glacial acetic acid in 4 parts of ethanol is heated until a solution is obtained. The solution is then cooled and the precipitate which forms is separated by filtration and recrystallized from a mixture of methanol and ether to give 4-[4-(10, 11 - dihydro-5H-dibenzo-[a,d]cyclohepten-5-yl)-1-piperazinyliminomethyl]-1-methyl-pyridinium iodide melting at about 250–251° C. with decomposition.

EXAMPLE 3

A solution of 5 parts of 1-amino-4-(10,11-dihydro-5H-dibenzo[a,d]cyclohepten-5-yl)piperazine, 5 parts of 4-formyl-1-methylpyridinium bromide, and 5 parts of glacial acetic acid in 20 parts of ethanol is heated until solution occurs. Ether is then added until the solution becomes almost cloudy. The precipitate which then forms is separated by filtration and recrystallized from a mixture of ethanol and ether to give 4-[4-(10,11-dihydro-5H-dibenzo [a,d]cyclohepten-5-yl) - 1 - piperazinyliminomethyl]-1-methylpyridinium bromide melting at about 240–242° C. with decomposition.

EXAMPLE 4

A mixture of 4 parts of 1-amino-4-(10,11-dihydro-5H-dibenzo[a,d]cyclohepten-5-yl)piperazine, 4 parts of 2-formyl-1-methylpyridinium bromide, and 4 parts of glacial acetic acid in 16 parts of ethanol is heated until solution takes place. Ether is then added up to cloudiness and the precipitate which forms is separated by filtration and recrystallized from a mixture of 2-propanol and tetrahydrofuran to give 2-[4-(10,11-dihydro-5H-dibenzo[a,d] cyclohepten-5-yl) - 1 - piperazinyliminomethyl]-1-methylpyridinium bromide melting at about 196–197° C. with decomposition.

EXAMPLE 5

The following reactions are carried out using the procedure described in Example 1B but sustituting equivalent quantities of the appropriate starting materials:

1-amino-4-(10,11-dihydro - 5H - dibenzo[a,d]cyclohepten-5-yl)piperazine is reacted with 3-formyl-1-methylpyridinium iodide to give 3-[4-(10,11-dihydro-5H-dibenzo [a,d]cyclohepten-5-yl) - 1 - piperazinyliminomethyl]-1-methylpyridinium iodide melting at about 228–229° C. with decomposition. The product is recrystallized from a mixture of ethanol and ether.

1 - amino-4-(5H-dibenzo[a,d]cyclohepten-5-yl)piperazine is reacted with 4-formyl-1-methylpyridinium iodide to give, after recrystallization from a mixture of methanol and ether, 4 - [4-(5H-dibenzo[a,d]cyclohepten-5-yl) - 1 - piperazinyliminomethyl]-1-methylpyridinium iodide melting at about 245–247° C. with decomposition.

1 - amino-4-(3-chloro-10,11-dihydro-5H-dibenzo[a,d]-cyclohepten-5-yl)piperazine is reacted with 3-formyl-1-methylpyridinium iodide to give 3-[4-(3-chloro-10,11-dihydro - 5H - dibenzo[a,d]cyclohepten-5-yl)-1-piperazinyliminomethyl]-1-methylpyridinium iodide melting at about 233–234° C. with decomposition, after recrystallization from a mixture of ethanol and ether.

1 - amino-4-(2-methyl-10,11-dihydro-5H-dibenzo[a,d]-cyclohepten-5-yl)piperazine is reacted with 4-formyl-1-methylpyridinium iodide to give 4-[4-(2-methyl-10,11-dihydro - 5H-dibenzo[a,d]cyclohepten-5-yl)-1-piperazinyliminomethyl]-1-methylpyridinium iodide.

EXAMPLE 6

Equivalent quantities of 1-amino-4-(10,11-dihydro-5H-dibenzo[a,d]cyclohepten-5-yl)homopiperazine and 1-amino - 4 - (5,6,7,12-tetrahydrodibenzo[a,d]cycloocten-12-yl)piperazine are each substituted for the 1-amino-4-(10, 11 - dihydro-5H-dibenzo[a,d]cyclohepten-5-yl)piperazine and the procedure of Example 1B is repeated. The products obtained are, respectively, 2-[4-(10,11-dihydro-5H-dibenzo[a,d]cyclohepten - 5 - yl) - 1 - homopiperazinyliminomethyl]-1-methylpyridinium iodide and 2-[4-(5,6, 7,12 - tetrahydrodibenzo[a,d]cycloocten - 12-yl)-1-piperazinyliminomethyl]-1-methylpyridinium iodide.

EXAMPLE 7

A solution of 2 parts of 1-amino-4-(5H-dibenzo[a,d]cyclohepten-5-yl)piperazine, 1.6 parts of 3-formyl-1-methylpyridinium iodide, and 0.3 part of acetic acid in 25 parts of ethanol is heated and then allowed to cool. The precipitate which forms is separated by filtration and recrystallized from ethanol to give 3-[4-(5H-dibenzo[a,d]cyclohepten-5-yl) - 1 - piperazinyliminomethyl]-1-methylpyridinium iodide melting at about 191–192° C. This compound has the following formula

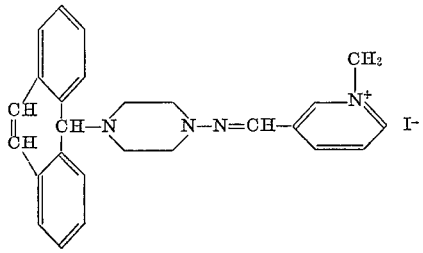

EXAMPLE 8

A mixture of 2 parts of 1-amino-4-(10,11-dihydro-5H-dibenzo[a,d]cyclohepten-5-yl) - 2,5 - dimethylpiperazine, 1.6 parts of 3-formyl-1-methylpyridinium iodide and 2 parts of glacial acetic acid in 65 parts of 2-propanol is heated on a steam bath for a few minutes. Ether is then added and the solution is allowed to stand for 48 hours. A precipitate forms and is separated by filtration to give 3 - [4 - (10,11-dihydro-5H-dibenzo[a,d]cyclohepten - 5- yl)-2,5-dimethyl-1-piperazinyliminomethyl] - 1 - pyridinium iodide melting at about 198–199° C.

EXAMPLE 9

5 parts of 1-(10,11-dihydro-5H-dibenzo[a,d]cyclohepten-5-yl) - 4 - (2-pyridylmethyleneamino)piperazine and 290 parts of ethyl iodide are placed in a citrate bottle and heated in a steam oven at 60° C. for 21 hours. Acetone is then added to the mixture which contains some crystals and the mixture is filtered. The separated solid is recrystallized from a mixture of ethanol and ether to give 2-[4 - (10,11-dihydro-5H-dibenzo[a,d]cyclohepten-5-yl)-1-piperazinyliminomethyl]-1 - ethylpyridinium iodide melting at about 202–203° C. with decomposition. This compound has the following formula

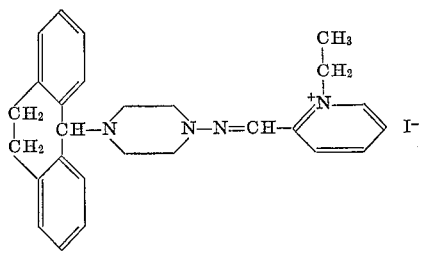

EXAMPLLE 10

A mixture of 10 parts of 1-(10,11-dihydro-5H-dibenzo[a,d]cyclohepten-5-yl) - 4 - (2-pyridylmethyleneamino) piperazine, 350 parts of ethyl bromide, and 80 parts of acetone is placed in a citrate bottle and heated in a steam oven at about 60° C. for 87 hours. A solid forms during this time. This is separated by filtration and recrystallized from a mixture of ethanol and ether to give 2-[4-(10,11-dihydro-5H-dibenzo[a,d]cyclohepten-5-yl) - 1 - piperazinyliminomethyl]-1-ethylpyridinium bromide melting at about 219–221° C. with decomposition.

EXAMPLE 11

A solution of 50 parts of pyridine-3-carboxaldehyde, 200 parts of methyl iodide, and 100 parts of acetone is placed in a citrate bottle and heated in an oven at 60° C. for one hour. At the end of this time period, the contents of the bottle are a solid mass. The bottle is then cooled and the solid is washed out with additional acetone. The precipitate is then separated by filtration to give 3-formyl-1-methylpyridinium iodide melting at about 178–179° C.

EXAMPLE 12

A solution of 14 parts of pyridine-2-carboxaldehyde, 30 parts of methyl bromide, and 25 parts of acetone is placed in a citrate bottle and heated in an oven at 60° C. for 18 hours. The mixture is then cooled in a refrigerator before the bottle is opened. The precipitate which is present is separated by filtration to give 2-formyl-1-methylpyridinium bromide melting at about 190° C. with decomposition.

117 parts of pyridine-4-carboxaldehyde and 40 parts of methyl bromide are dissolved in 25 parts of acetone and placed in a citrate bottle. The bottle is heated in an oven at about 60° C. for 3 hours. It is then cooled in a refrigerator before it is opened and acetone is added to wash out the solid which is present. This solid is separated by filtration to give 4-formyl-1-methylpyridinium bromide melting at about 101–103° C.

What is claimed is:
1. A compound of the formula

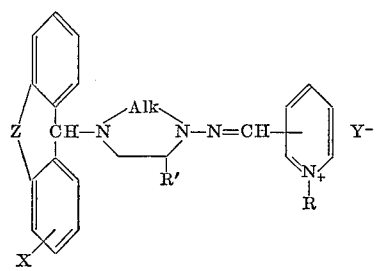

wherein Alk is selected from the group consisting of ethylene, propylene, and trimethylene; R is lower alkyl; R' is selected from the group consisting of hydrogen and methyl; X is selected from the group consisting of hydrogen, methyl, and chlorine; Y is halogen; and Z is selected from the group consisting of vinylene, ethylene, and trimethylene.

2. A compound according to claim 1 which is 2-[4-(10,11-dihydro-5H-dibenzo[a,d]cyclohepten - 5 - yl)-1-piperazinyliminomethyl]-1-methylpyridinium iodide.

3. A compound according to claim 1 which is 4-[4-(10,11-dihydro - 5H - dibenzo[a,d]cyclohepten - 5 - yl)-1-piperazinyliminomethyl]-1-methylpyridinium iodide.

4. A compound according to claim 1 which is 4-[4-(5H-dibenzo[a,d]cyclohepten - 5 - yl) - 1 - piperazinyliminomethyl]-1-methylpyridinium iodide.

5. A compound according to claim 1 which is 4-[4-(10,11-dihydro - 5H - dibenzo[a,d]cyclohepten - 5 - yl)-1-piperazinyliminomethyl]-1-methylpyridinium bromide.

References Cited

UNITED STATES PATENTS 3,290,300   12/1966   Cusic et al. _____ 260—240
3,377,344   4/1968    Cusic et al. _____ 260—240

OTHER REFERENCES

Burger: Medicinal Chemistry, vol. II, pp. 1019 to 1023, Interscience Publishers, Inc. N.Y. (1951).

JOHN D. RANDOLPH, Primary Examiner

U.S. Cl. X.R.

260—999